3,122,576
DI-TETRADECYLAMINE SALT OF BIS(4-CAR-
BOXYPHENYL)-DIMETHYL-STANNANE
Emil F. Jason and Ellis K. Fields, Chicago, Ill., assignors to Standard Oil Company, Chicago, Ill., a corporation of Indiana
No Drawing. Filed July 31, 1959, Ser. No. 830,717
1 Claim. (Cl. 260—429.7)

This invention relates to a novel group of tin-containing aromatic organic compounds. It especially relates to novel carboxy substituted diphenyl dialkyl stannane compounds and derivatives thereof, and to their utilization in the preparation of insecticidal, herbicidal and fungicidal compositions; improved resinous compositions and lubricants.

Specifically, this invention provides novel and useful tetravalent tin compounds which can be depicted by the following structural formula

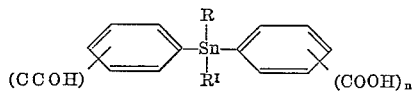

wherein R and $R^I$ are the same or different alkyl radicals having from 1 to 8 carbon atoms and $n$ is an integer from 1 to 3 inclusive.

The present invention provides the bis(carboxyphenyl) stannane compounds and their derivatives including the acid chlorides, esters, salts and amides. These novel compounds, especially the free acids and salts thereof are useful as intermediates and in the preparation of insecticidal, herbicidal and fungicidal compositions. They are particularly valuable as stabilizers for resigns, especially vinyl chloride-containing resins, providing improved heat stability to such resins, or plasticized compositions thereof.

The carboxy substituted diphenyl dialkyl stannane compounds of our invention are prepared by the oxidation of bis(alkaryl) tin compounds having the following general structural formula

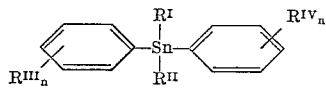

wherein $R^I$ and $R^{II}$ comprise hydrocarbon radicals of the character hereinbefore set forth and $R^{III}$ and $R^{IV}$ are the same or different lower alkyl radicals having from 1 to 4 carbon atoms, preferably methyl groups. Bis(alkaryl) tin compounds of this type can be readily prepared in any manner known to the art, for example, by reaction of dialkyl tin dichloride with the Grignard reagent prepared from alkyl-substituted halobenzenes, preferably alkyl-substituted bromobenzene. Typical dialkyl tin dichlorides having alkyl groups of 1 to 8 carbon atoms which can be used to provide suitable bis(alkaryl) tin compounds include for example, dimethyl tin dichloride, diethyl tin dichloride, methylethyl tin dichloride, dioctyl tin dichloride and the like. Examples of aromatic compounds which can be employed in the form of Grignard reagents for reaction with the dialkyl tin dichlorides include p-bromotoluene, 1-bromo-2,3-dimethylbenzene, p-bromoethylbenzene, p-bromoisopropylbenzene, bromopseudocumene, and the like.

The bis(carboxyphenyl) stannane compounds of our invention can be obtained by the oxidation of the corresponding bis(alkaryl) tetravalent tin compounds. While any konwn method for the oxidation of alkyl substituents on the aromatic nucleus can be employed, we prefer to effect the oxidation in the liquid phase with molecular oxygen-containing gas. The oxidation is effected in the presence of a catalyst, suitably a compound of a polyvalent heavy metal and preferably a conjoint catalyst comprising bromine and a heavy metal oxidation catalyst. By means of the heavy metalbromine catalyst, aromatic nuclei having more than one alkyl substituent are readily oxidized to the corresponding polycarboxylic acids, as taught and claimed in U.S. Patent 2,833,816 of Alfred Saffer and Robert S. Barker, patented May 6, 1958.

The following examples illustrate methods of preparation of the bis(carboxyphenyl) stannane compounds of this invention and certain precursors thereof.

EXAMPLE 1

A. Preparation of Bis(p-Tolyl) Dimethyl Tin (I)

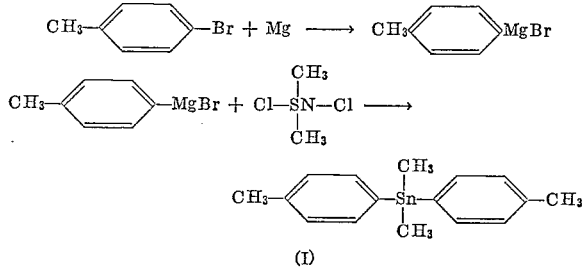

A Grignard reagent was prepared by addition of 68.4 g. (0.4 mole) of p-bromotoluene and 9.7 g. (0.4 mole) of magnesium turnings to anhydrous ethylether. The slurry of magnesium was then stirred and refluxed until reaction was essentially complete, as evidenced by almost complete dissolution of the magnesium turnings.

To this stirred ethereal Grignard solution was added 43.8 g. (0.2 mole) of dimethyl tin dichloride in portions over a period of 45 minutes. As the dimethyl tin dichloride was added the mixture gently refluxed and a white precipitate formed. The rate of addition was controlled so as to maintain a controllable rate of reflux. After addition was complete, the reaction mixture was refluxed for an additional 30 minutes, then cooled and the solids separated by filtration. The filtrate was poured into dilute aqueous hydrochloric acid solution, and the supernatant organic layer separated, washed with water and dried over anhydrous sodium sulfate. The ether was removed on a steam bath and the residual distilled to give ditolyl dimethyl tin in 79% yield as a pale yellow liquid boiling at 120–121° C. at 0.2 mm. Hg pressure and having a refractive index $n_D^{20}$ 1.5779.

B. Oxidation of Bis(p-Tolyl) Dimethyltin to Bis(4-Carboxyphenyl) Dimethyltin

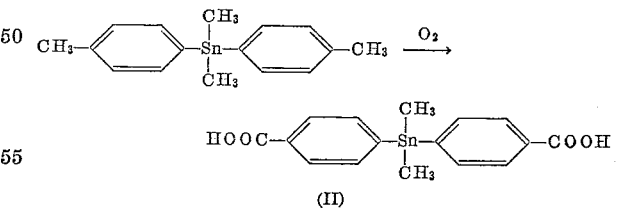

A mixture of 23 g. (0.069 mole) of ditolyltin compound (I), 150 g. glacial acetic acid and a solution of 0.2 g. cobalt acetate, 0.4 g. manganese acetate and 0.5 g. ammonium bromide in 6 ml. water was charged to a tubular reactor provided with reflux condenser and heating means. The mixture was heated to 400° F. and 400 p.s.i.g. and air passed through the solution by means of a sparger located below the liquid level. The reactor pressure was maintained by controlling the exit flow of gases. When oxygen absorption ceased (determined by analysis of the exit gases for oxygen), the reactor was cooled and the contents removed. The reactor contents were diluted with water, and the precipitate which formed separated by filtration. The solids were dissolved in dilute sodium hydroxide solution, filtered, and the solution acidified with dilute hydrochloric acid and the reprecipitated acid collected as a filter cake. A yield of 55% of theory was obtained. The acid melted at 255–258° C. Further purification by washing with refluxing n-heptane raised the melting point to 260–261° C. (dec.). Acid number: Calcd. for II, 286; found 290. Sn: Calcd., 30.5; found by spectral analysis, 31.9.

EXAMPLE 2

The oxidation procedure described in Example 1 is applied to bis(cumyl) dimethyl stannane. The oxidation produces a high yield of bis(4-carboxyphenyl) dimethyl stannane.

Similarly, di-para-xylyl dimethyl stannane is oxidized in high yield to a mixture of the corresponding tri- and tetra-carboxy stannane, 2,5-dicarboxyphenyl,2-methyl,5-carboxyphenyl dimethylstannane and bis(2,5-dicarboxyphenyl) dimethylstannane.

The oxidation of the alkyl diphenyl dialkyl stannane compounds employed in the preparation of the carboxy stannanes of our invention can be effected in the presence of any of the well known chemical oxidizing agents such as nitric acid, chromic acid in glacial acetic acid, potassium permanganate and the like, or the oxidation can be carried out by blowing air or oxygen through the batch. Conventional air oxidation procedures such as that described in U.S. Patent 2,245,528 of Loder may be employed. We prefer to effect the oxidation in the presence of a lower aliphatic carboxylic acid solvent and in the presence of a catalyst comprising in conjoint presence bromine and a heavy metal oxidation catalyst. Where desirable, the extent of oxidation can be controlled to effect the conversion of only one of several oxidizable alkyl substituents on the aromatic ring of the substituted stannane compound to a carboxylic acid group.

Oxidation can be effected in lower aliphatic carboxylic acids as solvent including acetic acid, propionic acid, butyric acid and the like. Mixtures of acids can be employed. As metal oxidation catalysts, heavy metals especially those having atomic numbers from 23 to 29 are used. Single metals including for example cobalt and manganese and mixtures of metals are effective. The metal may be supplied in the form of organic or inorganic salts, and the bromine likewise provided in the form of organic or inorganic compounds. Bromine compounds which are effective as conjoint catalysts include, for example sodium bromide, ammonium bromide, manganese bromide, tetrabromoethane, benzylbromide and the like.

The oxidation is effected at atmospheric or superatmospheric pressure, generally at a pressure at least sufficient to maintain liquid phase reaction conditions. Preferably temperatures between about 100° C. and 250° C. are employed, and pressures conveniently of 200–400 p.s.i.g. when acetic acid is the solvent. The metal catalyst is employed in amounts of 0.01 to about 1% by weight based on the tin compound to be oxidized, and bromine as the free element or in the form of organic or inorganic compounds is employed in an amount between about 0.1 and about 10 gram atoms bromine per atom of metal oxidation catalyst. The oxidizing gas may comprise air, pure oxygen or mixtures of oxygen and inert gas.

The novel bis(carboxyphenyl) stannane compounds of our invention have outstanding bactericidal and fungicidal properties and can be employed in insecticidal, fungicidal and herbicidal sprays and dust compositions. They may be employed alone or in combination with other known organic or inorganic insecticidal or fungicidal toxicants and as such may be applied in the form of solutions in organic solvents, as water emulsions or dispersed on solid carriers such as diatomaceous earth, bentonite, talc, and the like.

The acids of our invention are valuable for the preparation of alkyd type resins, as components of lubricating oil compositions, as anti-corrosion agents, wood preservatives and the like. They may be employed as heat stabilizers for synthetic resin compositions, for example for vinyl chloride polymers and copolymers, as illustrated in the following example.

EXAMPLE 3

A mixture of 50 parts by weight of polyvinyl chloride resin, 67 parts of octyl decyl phthalate plasticizer and 3 parts of the bis(4-carboxyphenyl) dimethyl stannane prepared in Example 1 was milled and sheeted and samples of the plasticized and stabilized resin compared for heat stability with an unstabilized composition containing the same ratio of polyvinyl chloride and plasticizer. The heat stability test was conducted at 115° C. for 72 hours. At the end of this period, it was noted that the unstabilized composition was dark brown in color, while the composition containing the stannane compound was very pale yellow. Similar compositions tested at 250° C. showed that the stannane compound imparted excellent heat stability to the resinous composition.

The bis(carboxyphenyl) dialkyl stannane compounds of our invention are valuable intermediates for the preparation of many useful derivatives including the salts, esters, anhydrides, acid chlorides and amides. Heavy metal salts such as those of lead, iron, manganese and cobalt can be employed as fungi-resistant paint driers; copper and mercury salts can be used as fungicides, wood preserving agents and the like. Other useful salts of these novel acids can be employed as stabilizers for polyvinyl chloride resins, as extreme pressure lubricants and as insecticides. We have prepared amine salts of bis(4-carboxyphenyl) dimethyl stannane and tested them as extreme pressure additives in hydrocarbon lubricants as illustrated by the following example.

EXAMPLE 4

Bis(4-carboxyphenyl) dimethyl stannane prepared as in Example 1 and distilled tetradecylamine (Armour & Company Armeen 140) were mixed and stirred in a mole ratio of 1:2 at 120–125° C. for several minutes. A clear liquid amine salt resulted which did not crystallize on cooling. The cooled viscous salt had a refractive index of $n_D^{20}$ 1.5010 and was soluble in lubricating oil.

The amine salt so prepared was tested as an extreme pressure additive by incorporation in a solvent extracted 5W lubricating oil base. Comparative data on the base oil and the base oil containing the amine salt obtained in tests on the Almen machine are tabulated below:

| Oil | Pass, lb. | Fail, lb. |
|---|---|---|
| 5W Base Oil | 8<br>8 | 10<br>10 |
| 5W Base Oil+1.5% Tetradecylamine salt | 28<br>30 | 30 |

These data show that the amine salt of Example 3 increases the load carrying capacity of solvent extracted 5W base oil to the limit of the Almen test machine. Similarly, useful amine salts of the carboxy stannane compounds of our invention can be prepared by reaction with primary and/or secondary aliphatic amines having from 1 to 20 carbon atoms in the molecule.

Esters having many unusual and beneficial properties may be prepared from the novel acids of our invention by esterifying them with saturated mono- or dihydric alcohols, with unsaturated alcohols or with phenols. Particularly valuable are the esters of the bis(carboxyphenyl) dialkyl stannanes with lower saturated alkanols having from 2 to 12 carbon atoms in the molecule, e.g. ethanol, butanol, n-octanol, isooctyl alcohol, decyl alcohol and the like. These compounds have useful properties as plasticizers for synthetic resins such as vinyl halides to which they impart valuable heat stability, and fungi-resistant properties. Dimethyl esters of the dibasic acids of our invention are worthy of mention as intermediates for the preparation of linear superpolyesters of the Dacron type and may be used as the sole diester component or in admixture with other aromatic dibasic acid diesters usually employed in the preparation of such linear superpolyesters by reaction with dihydric alcohols.

A wide variety of other useful ester derivatives of the novel acids of our invention can be readily prepared, including for example, esters of these acids with unsaturated alcohols such as allyl alcohol, which esters can be homo- or copolymerized with vinyl compounds by means of peroxide type catalysts.

Other useful derivatives of the novel acids of our invention include the acid chlorides, anhydrides and amides. The amides may be employed as components of resinous compositions, as plasticizers or lubricants, etc. They may be prepared by methods known in the art, for example by reaction of the acid halides or anhydrides with amines such as isopropyl amine, decylamine, allylamine, aniline and the like.

Having described our invention, we claim:

The di-tetradecylamine salt of bis(4-carboxyphenyl)-dimethyl stannane.

References Cited in the file of this patent

Luijten: "Investigations in the Field of Organotin Chemistry," published by Tin Research Inst. (England), pages 10 and 93.

Eskin et al.: "Chem. Zentr.," pages 2171 and 2175 (1939).

Chatt et al.: "J. Chem. Soc. (London)," pages 4403–4411 (1954).